United States Patent [19]

Horigome et al.

[11] Patent Number: 4,509,136
[45] Date of Patent: Apr. 2, 1985

[54] TELLER MACHINE WITH PRESET ABILITIES

[75] Inventors: Koichi Horigome, Nara; Seizo Okada, Osaka; Katsuji Nishimura, Habikino; Hachizou Yamamoto, Nara, all of Japan

[73] Assignee: Sharp Kabushiki Kaisha, Osaka, Japan

[21] Appl. No.: 44,315

[22] Filed: May 31, 1979

[30] Foreign Application Priority Data

| Jun. 1, 1978 | [JP] | Japan | 53-66395 |
| Jul. 25, 1978 | [JP] | Japan | 53-92138 |
| Jul. 25, 1978 | [JP] | Japan | 53-92139 |
| Jul. 25, 1978 | [JP] | Japan | 53-92140 |
| Jul. 25, 1978 | [JP] | Japan | 53-92142 |

[51] Int. Cl.³ .............................................. G06F 15/00
[52] U.S. Cl. ................................. 364/900; 364/401; 364/405; 364/406
[58] Field of Search ... 364/200 MS File, 900 MS File, 364/401, 405, 406; 235/432, 379; 101/67, 90, 113; 400/70, 705.2, 710, 76

[56] References Cited

U.S. PATENT DOCUMENTS

| 3,541,256 | 11/1970 | Levy et al. | 364/200 X |
| 3,648,020 | 3/1972 | Tateisi et al. | 364/406 |
| 3,719,927 | 3/1973 | Michels et al. | 340/149 R |
| 3,748,452 | 7/1973 | Ruben | 364/200 X |
| 3,806,711 | 4/1974 | Cousins | 364/405 |
| 3,812,945 | 5/1974 | Koplow et al. | 400/76 X |
| 3,906,457 | 9/1975 | Mattedi et al. | 364/200 |
| 3,946,217 | 3/1976 | Tsujikawa et al. | 364/405 |
| 3,958,224 | 5/1976 | Boyd et al. | 364/900 |
| 3,970,992 | 7/1976 | Boothroyd et al. | 364/406 X |
| 4,001,568 | 1/1977 | Iizuka et al. | 364/406 |
| 4,063,221 | 12/1977 | Watson et al. | 364/900 |
| 4,091,448 | 5/1978 | Clausing | 364/200 |
| 4,095,738 | 6/1978 | Masuo | 364/405 X |
| 4,138,733 | 2/1979 | Tadakuma et al. | 364/405 X |
| 4,142,235 | 2/1979 | Tadakuma et al. | 364/405 |
| 4,144,567 | 3/1979 | Tadakuma et al. | 364/405 |

OTHER PUBLICATIONS

Cannon Plain Paper Copier NP80, Instruction Manual, col. 5 and 6.

Primary Examiner—James D. Thomas
Assistant Examiner—David Y. Eng
Attorney, Agent, or Firm—Birch, Stewart, Kolasch & Birch

[57] ABSTRACT

A teller machine includes numeral keys, function keys, a central processor unit, and a printer for printing out transaction data onto a desired bill. A preset ability is employed by the teller machine so that a bill issuance number is limited at operator's choice, the print out operation is conducted only when preselected function keys are operated, and only preselected function keys are made effective.

8 Claims, 6 Drawing Figures

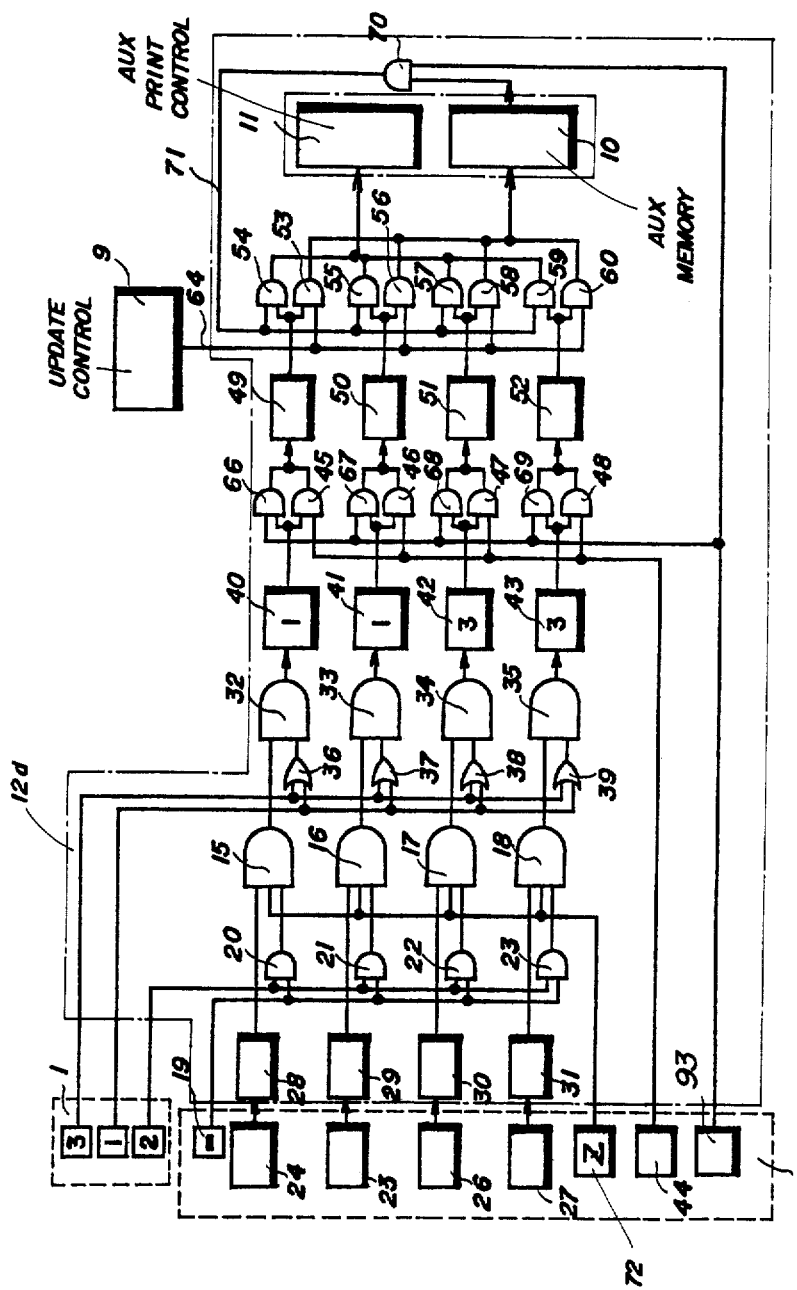
FIG. 2 (TRANSACTION MEMORY CONTROL -12d-)

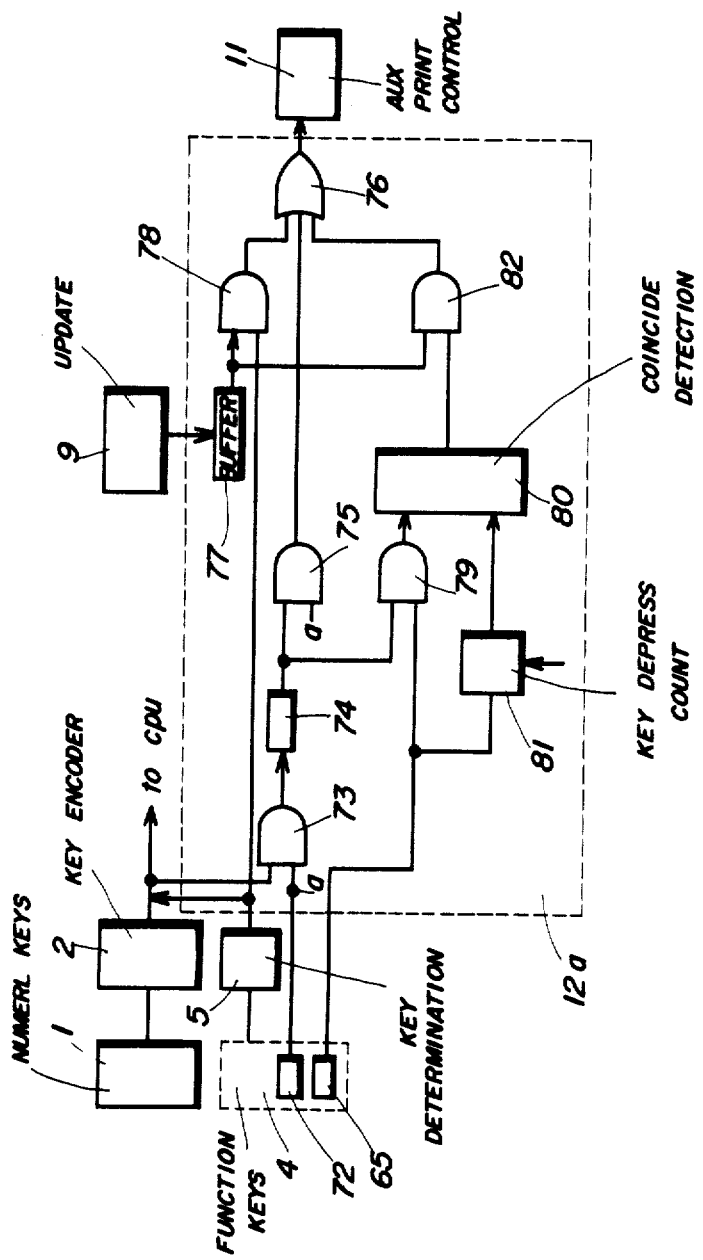
FIG. 3 (BILL NUMBER PRESET CONTROL —12a—)

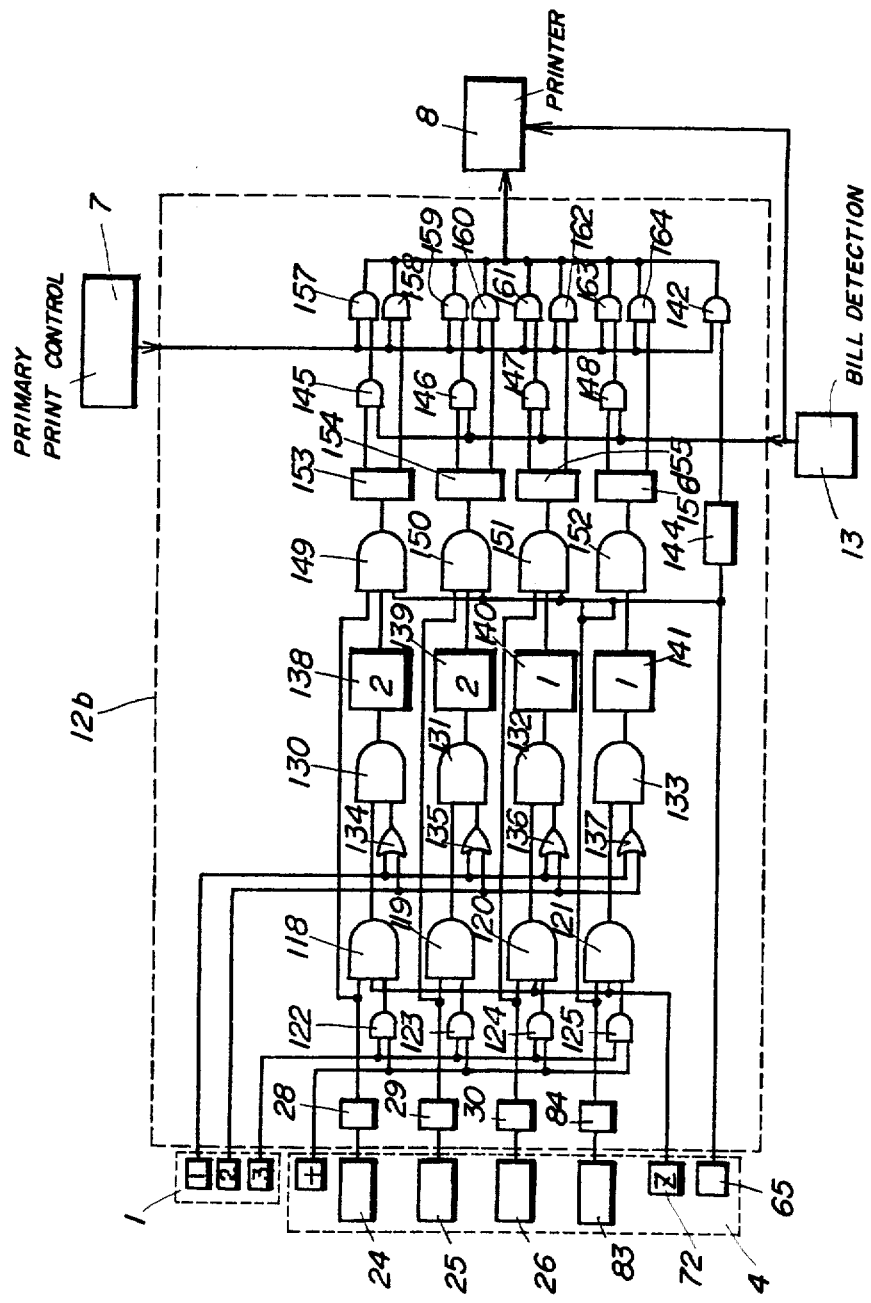
FIG.4 (BILL PRINTOUT CONTROL —12b—)

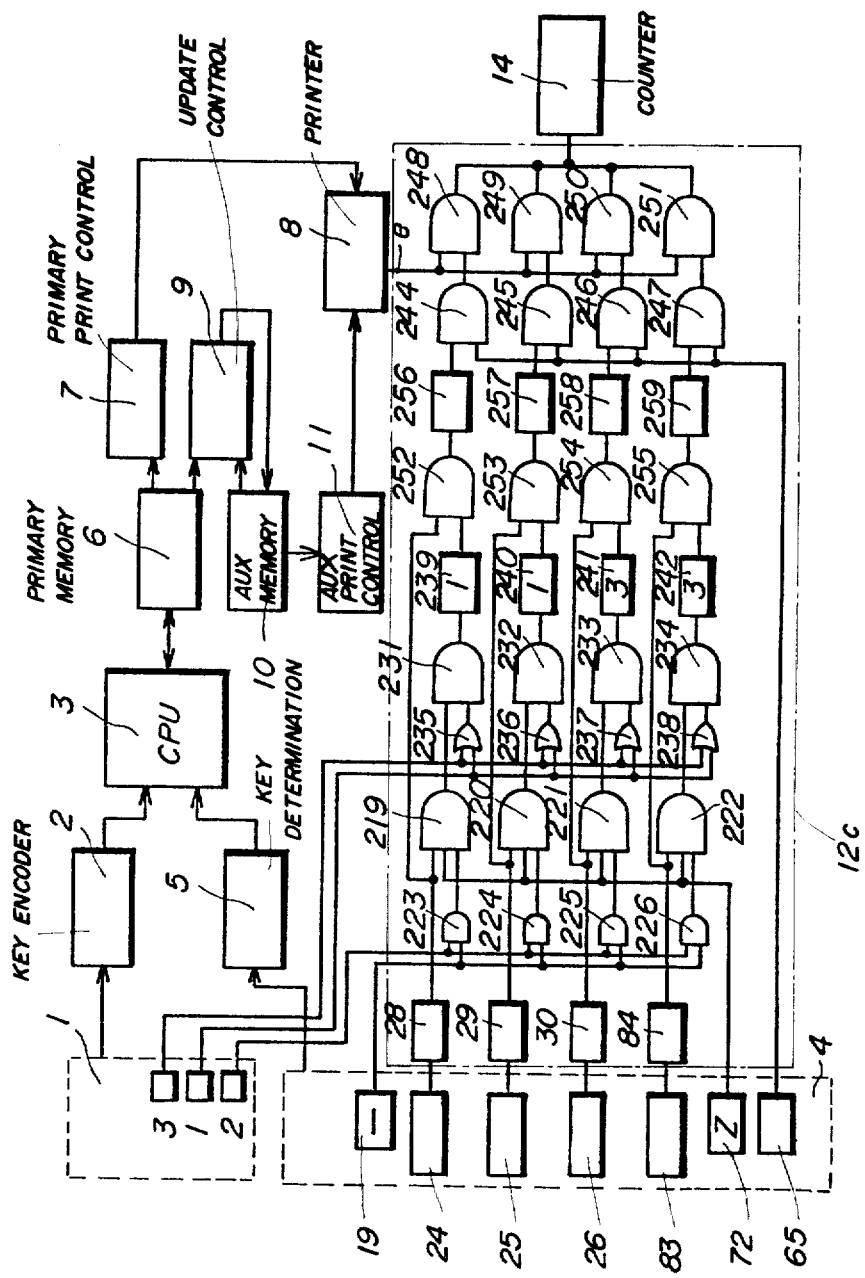
FIG. 5 (BILL NUMBER COUNT CONTROL -12c-)

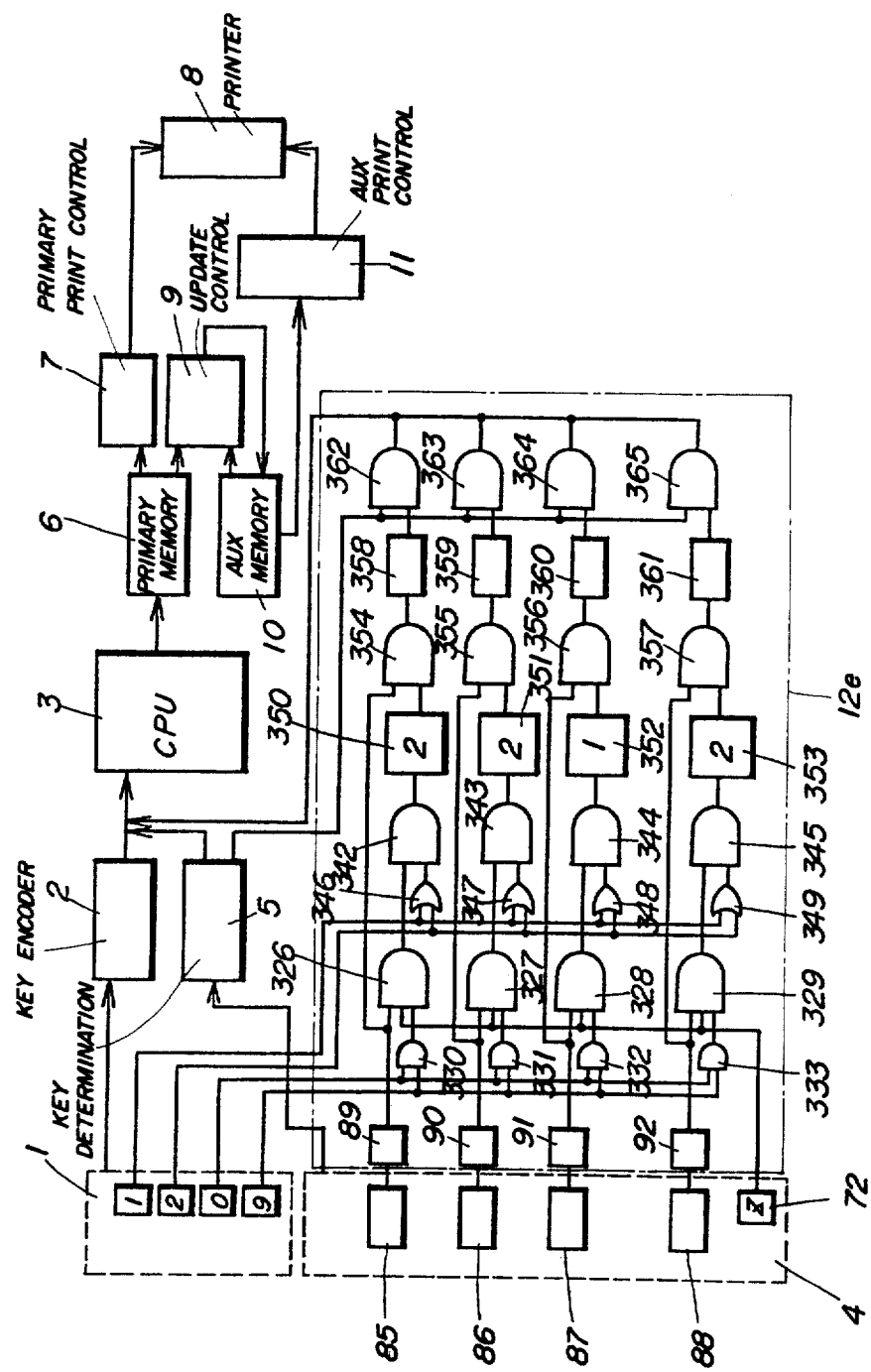
FIG. 6 (KEY PRESET CONTROL —12e—)

TELLER MACHINE WITH PRESET ABILITIES

BACKGROUND AND SUMMARY OF THE INVENTION

The present invention relates to a teller machine and, more particularly, to a preset control system in the teller machine.

Teller machines are used in banks, and can print out various kinds of information on a desired bill such as a check or a draft. There is a great possibility that the required transaction information varies among different banks. The present invention is to provide a teller machine of versatile operations.

An object of the present invention is to provide a preset control system in a teller machine for presetting a particular function at the operator's choice.

Another object of the present invention is to provide a memory control system for selectively memorizing preselected transaction data in a teller machine.

Still another object of the present invention is to provide a bill printout control system for allowing issuance of bills by a preselected limit number.

Yet another object of the present invention is to provide a print control system for allowing issuance of a bill only when a preselected key is actuated during transaction data input operations.

A further object of the present invention is to provide a preset control system for making a selected key inoperative in a teller machine.

Other objects and further scope of applicability of the present invention will become apparent from the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a preset mode key is provided on a keyboard panel for presetting a desired function of a teller machine at operator's choice.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 2 is a block diagram of a transaction data memory control unit included in the teller machine of FIG. 1;

FIG. 3 is a block diagram of a bill issuance number preset control unit included in the teller machine of FIG. 1;

FIG. 4 is a block diagram of a bill printout control unit included in the teller machine of FIG. 1;

FIG. 5 is a block diagram of a bill issuance number count control unit included in the teller machine of FIG. 1; and FIG. 6 is a block diagram of a key operation preset control unit included in the teller machine of FIG. 1.

DESCRIPTION OF THE PREFERRED EMBODIMENTS

Figure 1:
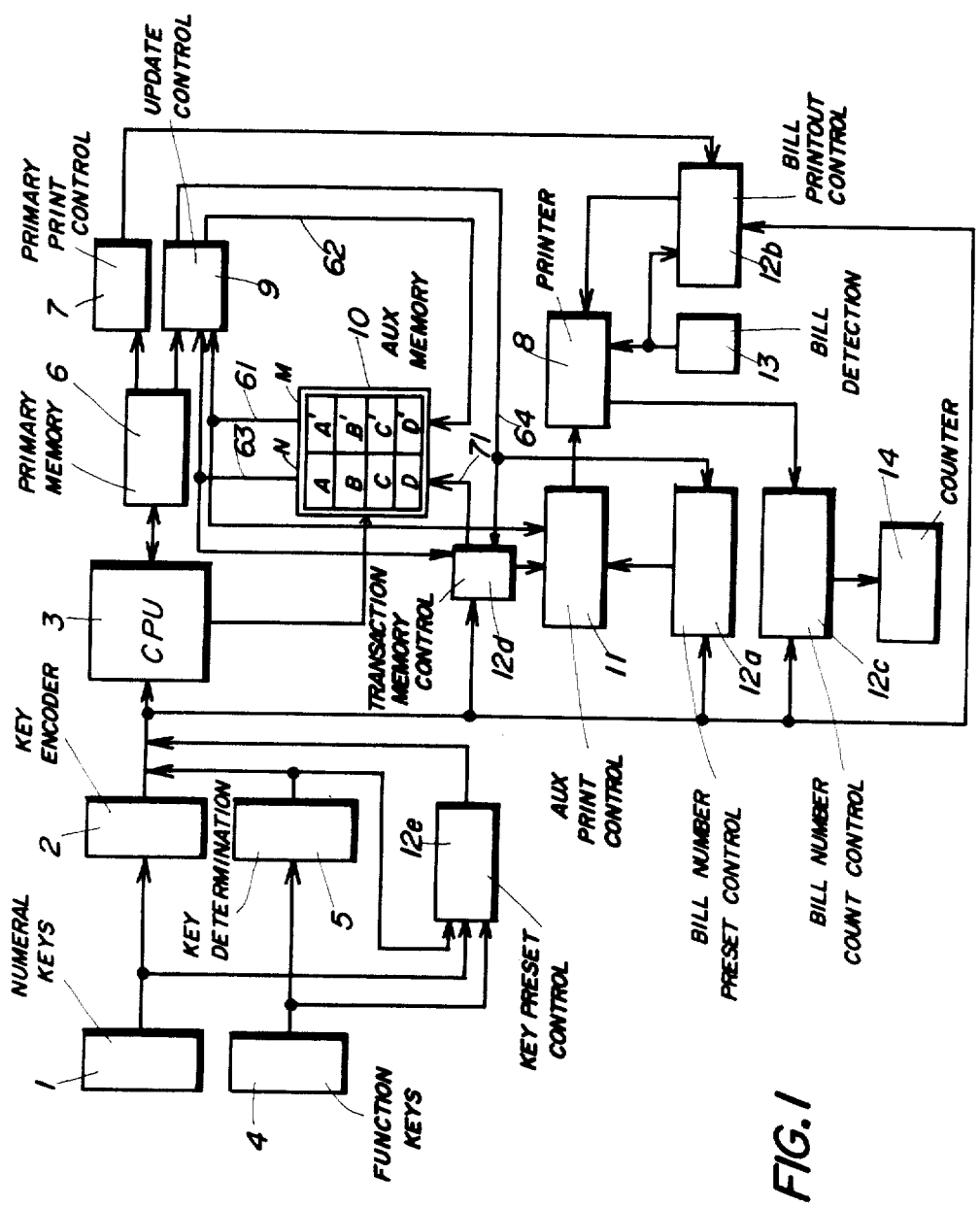
FIG. 1 is a block diagram of an embodiment of a teller machine of the present invention.

FIG. 1 is a block diagram of an embodiment of a teller machine of the present invention.

The teller machine of the present invention mainly comprises a keyboard panel including numeral keys 1 and function keys 4, a central processor unit 3, and a printer 8. The function keys 4 include a "plus" key, a "minus" key, a "total" key, a "sub-total" key, a "paper feed" key, a "release key", a "clear" key, a "list" key, a "previous balance" key, a "deposit" key, a "cash out" key, a "cash in" key, a "cash check" key, an "add print" key, a "reading and resetting of totals" key, a "miscellaneous" key, a "miscellaneous cash" key, a "duplicate" key, a "repeat" key, a "balance" key, and an "account number" key. The keyboard panel further includes a mode switch for placing the teller machine in the preset mode, of which detailed operation will be described later.

Numeral information introduced through the numeral keys 1 is applied to the central processor unit 3 via a key encoder 2. A key determination circuit 5 is connected to the function keys 4 for determining the depressed key included in the function keys 4, thereby developing instruction commands to the central processor unit 3. The thus introduced information and the calculation result derived from the central processor unit 2 are stored in a primary memory 6.

When the introduction of the transaction data is completed, the "cash check" key is actuated to indicate the completion of the data entry. Upon actuation of the "cash check" key, the central processor unit 3 performs the check operation and, then, transfer the transaction data stored in the primary memory 6 to a primary print control circuit 7 is performed. The primary print control circuit 7 activates the printer 8 to print out the transaction data on a journal paper. The transaction data stored in the primary memory 6 is also applied to an update control circuit 9, which functions to update or accumulate the transaction data stored in an auxiliary memory 10.

The auxiliary memory 10 mainly comprises two memory blocks N and M. The memory block N stores the accumulated transaction data in the teller by teller fashion. The memory block N comprises a section A for storing cash in total information, a section B for storing cash out total information, a section C for storing check information, and a section D for storing note information. The memory block M stores the accumulated transaction data of one day. The memory block M comprises a section A' for storing cash in total information, a section B' for storing cash out total information, a section C' for storing check information, and a section D' for storing note information. The transaction data stored in the auxiliary memory 10 is printed out on the journal paper through an auxiliary print control circuit 11 and the printer 8.

When the transaction data is desired to be printed out on a bill, a bill is inserted into the printer 8 and the "duplicate" key is actuated. Upon actuation of the "duplicate" key, the transaction data stored in the primary memory 6 is applied to the printer 8 through the primary print control circuit 7. The contents stored in the primary memory 6 are cleared when the following transaction data entry operation is conducted.

A transaction data memory control unit 12d is provided for controlling selective update operation of the transaction data in the memory block N. More specifically, the operator can preset the memory control so that only preselected transaction data is updated in the memory block N.

FIG. 2 shows the transaction data memory control unit 12d. Like elements corresponding to those of FIG. 1 are indicated by like numerals.

Now assume that only the cash in information and the cash out information are desired to be updated in the memory block N. The check information and the note information are not desired to be stored in the memory block N. FIG. 2 shows the function keys 4 including a minus key 19, a cash in key 24, a cash out key 25, a check key 26, a note key 27, a mode switch 72 for placing the teller machine in the preset mode, a completion key 44 for instructing the completion of data entry, and a print out key 93 for conducting the printing out operation.

To perform the preset operation, the mode switch 72 is set at the preset mode, wherein a high level logic signal is applied to one input terminal of AND gates 15, 16, 17 and 18. The numeral key "2" and the minus key 19 are simultaneously actuated to turn on AND gates 20, 21, 22 and 23, which develop high level logic signals toward the AND gates 15, 16, 17 and 18. That is, the AND gates 15, 16, 17 and 18 are placed in the operative condition.

Thereafter, the cash in key 24 is actuated. A cash in key detection circuit 28 develops a high level logic signal to turn on the AND gate 15. In this way, an AND gate 32 becomes operative. Then, the numeral key "1" is actuated to introduce the information "1" into a preset memory 40 through an OR gate 36 and the AND gate 32. The information "1" represents the fact that the transaction data should be updated in the memory block N cf the auxiliary memory 10 when the cash in key 24 is operated.

In a same manner, the cash out key 25 is actuated to turn on the AND gate 16 through a cash out key detection circuit 29. The information "1" is introduced and stored in a preset memory 41 via an OR gate 37 and an AND gate 33 to indicate that the transaction data should be updated in the memory block N of the auxiliary memory 10 when the cash out key 25 is operated.

In addition, the check key 26 is actuated to preset the operation mode wherein the transaction data is not updated in the memory block N of the auxiliary memory 10 when the check key 26 is operated. Upon actuation of the check key 26, a check key detection circuit 30 develops a high level logic signal to turn on the AND gate 17. At this moment, the numeral key "3" is actuated to introduce the information "3" into a preset memory 42 through an OR gate 38 and an AND gate 34. The information "3" shows that the transaction data should not be updated in the memory block N of the auxiliary memory 10 when the check key 26 is operated.

In a same way, the information "3" is introduced and stored in a preset memory 43 through the use of a note key detection circuit 31, an OR gate 39 and an AND gate 35, thereby presetting the operation mode wherein the transaction data is not updated in the memory block N of the auxiliary memory 10 when the note key 27 is operated.

Thereafter, the mode switch 72 is released from the preset mode to complete the preset operation.

In the normal transaction registration mode, the completion key 44 is actuated when a specific transaction data is completely introduced. Upon actuation of the completion key 44, AND gates 45, 46, 47 and 48 are forced operative. Therefore, the preset information stored in one of the preset memories 40, 41, 42 and 43 is applied to a cash in information determination circuit 49, a cash out information determination circuit 50, a check information determination circuit 51, or a note information determination circuit 52, respectively.

Since the cash in information determination circuit 49 receives the preset information "1", the cash in information determination circuit 49 develops a high level logic signal to make operative AND gates 53 and 54. In a same way, AND gates 55 and 56 connected to the cash out information determination circuit 50 are made operative.

Contrarily, the check information determination circuit 51 and the note information determination circuit 52 receive the preset information "3", and develop low level logic signals, respectively. Therefore, AND gates 57, 58, 59 and 60 are not operative.

As already discussed above, when the completion key 44 is actuated, the central processor unit 3 performs the checking operation and, then, transfer the transaction data stored in the primary memory 6 to the primary print control circuit 7, thereby printing out the transaction data on the journal paper through the printer 8.

At the same time, the transaction data stored in the sections A', B', C' and D' of the memory block M of the auxiliary memory 10 is introduced into the update control circuit 9 through a signal line 61. The update control circuit 9 functions to add the present transaction data stored in the primary memory 6 to the previous data stored in the sections A', B', C' and D' of the memory block M of the auxiliary memory 10. The thus updated data is again introduced into the sections A', B', C' and D' of the memory block M of the auxiliary memory 10 through a signal line 62.

The transaction data stored in the sections A, B, C and D of the memory block N of the auxiliary memory 10 is also applied to the update control circuit 9 through a signal line 63. And, the updated transaction data is applied from the update control circuit 9 to the transaction data memory control unit 12d through a signal line 64. More specifically, the updated transaction data is applied to the AND gates 53, 56, 68 and 60 through the signal line 64. Since the AND gates 53 and 56 are operative, only the cash in information and the cash out information are updated and stored in the sections A and B of the memory block N of the auxiliary memory 10. The check information and the note information are never updated in the sections C and D of the memory block N of the auxiliary memory 10.

When the thus introduced transaction data is desired to be printed out on a desired bill, the bill is inserted into the printer 8 and the "duplicate" key is actuated, whereby the transaction data stored in the primary memory 6 is printed out on the bill.

When the teller is exchanged, the print out key 93 is actuated to print out desired information stored in the memory block N of the auxiliary memory 10 on the journal paper. When the print out key 93 is actuated, AND gates 66, 67, 68, 69 and 70 are made operative. The preset information stored in the preset memories 40, 41, 42 and 43 is applied to the information determination circuits 49, 50, 51 and 52 through the AND gates 66, 67, 68 and 69, respectively. Under the given example, the transaction data stored in the sections A and B of the memory block N of the auxiliary memory 10 is applied to the auxiliary print control circuit 11 through the AND gate 70, a signal line 71 and the AND gates 54 and 55. That is, the transaction data related to the cash in information and the cash out information is printed out on the journal paper. The check information and the note information are never printed out on the journal paper. When the above-mentioned exchange operation is conducted, the transaction data stored in the memory block N of the auxiliary memory 10 is cleared.

When the transaction of one day is completed, the accumulated transaction data stored in the memory block M of the auxiliary memory 10 is applied to the auxiliary print control circuit 11 through the signal line 61, thereby printing out the accumulated transaction data on the journal paper through the printer 8.

As already discussed above, desired information can be printed out on a desired bill. A bill issuance number preset control unit 12a is provided to preset a limit on the number of the bill to be issued.

FIG. 3 shows the bill issuance number preset control unit 12a. Like elements corresponding to those of FIGS. 1 and 2 are indicated by like numerals.

To preset the limit number of the bill, the mode switch 72 is set at the preset mode, wherein AND gates 73 and 75 are made operative. Then, a preselected limit number, for example, "5" is introduced through the numeral keys 1. The thus introduced limit number "5" is stored in a bill issuance limit number memory 74. The limit number "5" stored in the bill issuance limit number memory 74 is applied to the auxiliary print control circuit 11 through the AND gate 75 and an OR gate 76, whereby the limit number "5" is printed out on the journal paper.

After completion of the preset operation, the mode switch 72 is released from the preset mode. In the normal transaction operation, the transaction data derived from the update control circuit 9 is applied to a buffer memory 77. The transaction data temporarily stored in the buffer memory 77 is applied to the auxiliary print control circuit 11 through an AND gate 78 and the OR gate 76, thereby printing out the transaction data on the journal paper.

When the transaction data is desired to be printed out on a desired bill, the bill is inserted into the printer 8 and a duplicate key 65 is actuated. Upon actuation of the duplicate key 65, the limit number "5" stored in the bill issuance limit number memory 74 is applied to a coincidence detection circuit 80 through an AND gate 79. At the same time, a key depression counter 81 counts up, and develops information "1" toward the coincidence detection circuit 80. When the information derived from the key depression counter 81 is not identical with the limit number information derived from the AND gate 79, the coincidence detection circuit 80 develops an output signal to turn on an AND gate 82. Therefore, the transaction data stored in the buffer memory 77 is applied to the auxiliary print control circuit 11 through the AND gate 82 and the OR gate 76.

Now assume that four bills have been already issued, and the key depression counter 81 stores information "4". Under these conditions, when the duplicate key 65 is actuated, the contents stored in the key depression counter 81 are increased to "5". The coincidence detection circuit 80 does not develop the output signal to turn on the AND gate 82 and, therefore, the transaction data is not printed out on the bill any more. The key depression counter 81 is cleared to zero when the next transaction operation is initiated.

To perform an accurate print out operation on the bill, a bill printout control system is provided. The bill printout control system mainly comprises a bill detection unit 13 for detecting the insertion of the bill into the printer 8, and a bill printout control unit 12b.

FIG. 4 shows the bill printout control unit 12b. Like elements corresponding to those of FIG. 1 through 3 are indicated by like numerals.

The bill printout control unit 12b mainly functions to detect whether the bill is inserted in the printer 8 when specific function keys are actuated. Now assume that the bill detection is required only when the cash in key 24 and the cash out key 25 are used to perform the transaction registration. And, the bill detection is not required when the check key 26 and other function keys 83 are operated.

To preset the selective detection operation, the mode switch 72 is set at the preset mode. When the mode switch 72 is set at the preset mode, AND gates 118, 119, 120 and 121 receive a high level logic signal at the one input terminal. Under these conditions, the plus key and the numeral key "3" are simultaneously actuated to turn on AND gates 122, 123, 124 and 125, thereby making the AND gates 118, 119, 120 and 121 operative.

Then, the cash in key 24 is actuated, and the cash in key detection circuit 28 develops the high level logic signal to turn on the AND gate 118. The AND gate 118 develops a high level logic signal to an AND gate 130. The numeral key "2" is actuated to introduce numeral information "2" into a preset memory 138 through an OR gate 134 and the AND gate 130. The numeral information "2" represents the fact that the bill detection should be carried out when the cash in key 24 is actuated in the transaction entry operation.

In a same way, the cash out key 25 is actuated to develop the high level logic signal from the cash out key detection circuit 29. The numeral information "2" is introduced and stored in a preset memory 139 via an OR gate 135 and an AND gate 131.

Similarly, the numeral information "1" is stored in a preset memory 140 via an OR gate 136 and an AND gate 132 to indicate that the bill detection is not required when the check key 26 is actuated during transaction entry opeation. Moreover, the other keys 83 are actuated to develop a high level logic signal from a detection circuit 84. The numeral key "1" is operated to introduce the numeral infomation "1" into a preset memory 141 via an OR gate 137 and an AND gate 133. After completion of the above-mentioned preset operation, the mode switch 72 is released from the preset mode.

In the normal transaction registration mode, the duplicate key 65 is not actuated and, hence, a duplicate key detection circuit 144 develops a high level logic signal to turn on an AND gate 142. Therefore, the transaction data applied from the primary print control circuit 7 is applied to the printer 8 through the AND gate 142 to print out the transaction data on the journal paper.

When the transaction data is desired to be printed out on a bill, the bill is inserted into the printer 8. The bill detection unit 13 develops a detection signal to make AND gates 145, 146, 147 and 148 operative. Then, the duplicate key 75 is actuated. A high level logic signal is applied to one input terminal of AND gates 149, 150, 151 and 152. The duplicate key detection circuit 144 develops a low level logic signal to disable the AND gate 142.

Now assume that the cash in key 24 is actuated during the transaction operation. The AND gate 149 is turned on to transfer the numeral information "2" stored in the preset memory 138 to an information determination circuit 153. The information determination circuit 153 develops a high level logic signal toward the AND gate 145, which develops a high level logic signal to an AND gate 157 and a low level logic signal to an AND gate 158. Therefore, the transaction data is applied from the primary print control circuit 7 to the printer 8 through the AND gate 157. Of course, if the bill is not inserted into the printer 8, the AND gate 145 is not turned on and, therefore, the print out operation is not conducted.

Similarly, when the cash out key 25 is used during the transaction operation, the numeral information "2" is transferred to an information determination circuit 154 upon actuation of the duplicate key 65. The AND gate 146 and an AND gate 159 are turned on, and an AND gate 160 is turned off. The transaction data is applied to the printer 8 through the AND gate 159.

If the check key 26 is actuated during the transaction data entry operation, the numeral information "1" stored in the preset memory 140 is applied to an information determination circuit 155 via the AND gate 151 upon actuation of the duplicate key 65. The information determination circuit 155 develops a low level logic signal to the AND gate 147 and, therefore, the AND gate 147 and an AND gate 161 are turned off. At the same time, the information determination circuit 155 develops a high level logic signal to an AND gate 162. Accordingly, the transaction data derived from the primary print control circuit 7 is applied to the printer 8 through the AND gate 162. That is, the printing out operation is conducted onto the journal paper or the bill if the bill is inserted into the printer 8. More specifically, the printing out operation is conducted without detecting the presence of the bill.

When the other keys 83 are operated during the transaction registration, an information determination circuit 156 develops a signal to turn on an AND gate 164, and to turn off an AND gate 163. Operation is similar to that is achieved when the check key 26 is used.

The teller machine of the present invention further includes a counter 14 for counting an issued bill number, and a bill issuance number count control unit 12c for controlling a selective count operation, wherein the count operation is conducted only when specific function keys are operated during the transaction registration operation.

FIG. 5 shows the bill issuance number count control unit 12c. Like elements corresponding to those of FIGS. 1 and 4 are indicated by like numerals.

Main function of the bill issuance number count control unit 12c is that the operator can preset the selective count operation. More specifically, the operator can select specific function keys so that the bill issuance number count operation is conducted only when the specific function keys are actuated during the transaction registration operation.

To perform the preset operation, the mode switch 72 is set at the preset mode, wherein a high level logic signal is applied from the mode switch 72 to AND gates 219, 220, 221 and 222. Now assume that the bill issuance number count operation is required to be performed only when the cash in key 24 or the cash out key 25 is operated during the transaction data registration operation.

The numeral key "2" and the minus key 19 are simultaneously actuated to turn on AND gates 223, 224, 225 and 226. Then, the cash in key 24 is actuated. The cash in key detection circuit 28 develops the high level logic signal, which is applied to an AND gate 231 through the AND gate 219. The numeral key "1" is actuated to introduce the information "1" into a preset memory 239 through an OR. gate 235 and the AND gate 231. The information "1" indicates that the bill issuance number count operation should be carried out. In the same way, the information "1" is stored in a preset memory 240 through the use of the cash out key 25, an OR gate 236 and an AND gate 232.

Thereafter, the check key 26 is actuated to turn on the AND gate 221. The numeral key "3" is actuated to introduce the information "3" into a preset memory 241 via an OR gate 237 and an AND gate 233. The information "3" indicates that the bill issuance number count operation is not required. Similarly, the information "3" is stored in a preset memory 242 through the use of the other function keys 83, an OR gate 238 and an AND gate 234.

After completion of the above-mentioned preset operation, the mode switch 72 is released from the preset mode. The normal transaction data entry operation is conducted under these conditions.

As already discussed, when the transaction data is desired to be printed out on the bill, the bill is inserted into the printer 8, and the duplicate key 65 is actuated. Upon actuation of the duplicate key 65, a high level logic signal is applied to one input terminal of AND gates 244, 246 and 247. The transaction data is printed out on the bill by the printer 8, and a bill print completion signal "e" is developed from the printer 8. The thus developed bill print completion signal "e" is applied to one input terminal of AND gates 248, 249, 250 and 251.

When the cash in key 24 is operated during the transaction data entry operation, an AND gate 252 transfer the information "1" to an information determination circuit 256, which develops a high level logic signal to the AND gate 244. Therefore, the AND gate 248 is turned on to transfer the bill print completion signal "e" to the counter 14. The AND gate 249 is also turned on via an AND gate 253, an information determination circuit 257 and the AND gate 245 if the cash out key 25 is operated during the transaction data entry operation.

However, when the check key 26 or the other function keys 83 are operated during the transaction data entry operation, the informtion "3" is applied to information determination circuits 258 and 259 through AND gates 254 and 255, respectively. The information determination circuits 258 and 259 develop a low level logic signal to turn off the AND gates 246 and 247. Therefore, the count operation is not conducted by the counter 14.

The teller machine of FIG. 1 further includes a key operation preset control unit 12e for selectively ignoring the function keys. More specifically, the operator can selectively permit the function of specific function keys by preferably presetting the information into the key operation preset control unit 12e.

FIG. 6 shows the key operation preset control unit 21e. Like elements corresponding to those of FIGS. 1 and 4 are indicated by like numerals.

There is a possibility that a specific function key is not required in a specific bank. To ensure an accurate operation, it is desirable to preset an operation condition wherein preselected function keys are not operative even when they are actuated. Now assume that an ours' check key 85, an other bankers' check key 86 and a change fund key 88 are not required.

To preset an operation condition wherein the ours' check key 85, the other bankers' check key 86 and the change fund key 88 are not operative, the mode switch 72 is set at the preset mode. A high level logic signal is applied to one input terminal of AND gates 326, 327, 328 and 329. Then, the numeral keys "0" and "9" are simultaneously operated to turn on AND gates 330, 331, 332 and 333. High level logic signals are applied from the AND gates 330, 331, 332 and 333 to the AND gates 326, 327, 328 and 329, respectively.

Thereafter, the our's check key 85 is operated. An ours' check key detection circuit 89 develops a detection signal to turn on the AND gate 326, of which an output signal is applied to one input terminal of an AND gate 342. Then, the numeral key "2" is actuated to introduce the information "2" into a preset memory 350 through an OR gate 346 and the AND gate 342. The information "2" represents the fact that the our's check key 85 should be made unoperative.

In a same way, the other bankers' check key 86 is actuated. An other banker's check key detection circuit 90 develops a detection signal to turn on the AND gate 327, of which an output signal is applied to one input terminal of an AND gate 343. Then, the numeral key "2" is actuated to introduce the information "2" into a preset memory 351 via an OR gate 347 and the AND gate 343. Similarly, the information "2" is introduced into a preset memory 353 corresponding to the change fund key 88 through the use of a change fund key detection circuit 92, an AND gate 345 and an OR gate 349.

Then, other function keys 87 are operated. An other function key detection circuit 91 develops a detection output to turn on the AND gate 328, whereby an AND gate 344 is made operative. The numeral key "1" is actuated to introduce the information "1" into a preset memory 352 via an OR gate 348 and the AND gate 344. The information "1" indicates that the other function keys 87 are effective. After completion of the above-mentioned preset operation, the mode switch 72 is released from the preset mode.

In the normal transaction data entry operation, if the ours' check key 85 is operated, the our's check key detection circuit 89 develops the detection signal, which enables an AND gate 354. Therefore, the information "2" stored in the preset memory 350 is applied to an information determination circuit 358. Upon receiving the information "2", the information determination circuit 358 develops a low level logic signal to disable an AND gate 361. Therefore, the our's check key signal is not applied to the following central processor unit 3.

In the same way, when the other bankers' check key 86 is operated during the transaction data entry, operation, an AND gate 363 is turned off via an AND gate 355 and an information determination circuit 259. Moreover, when the change fund key 88 is actuated, an AND gate 365 is turned off through the use of an AND gate 357 and an information determination circuit 264.

Contrarily, when the other function keys 87 are operated during the transaction data entry operation, the detection circuit 91 develops the detection output to turn on an AND gate 356. The information "1" stored in the preset memory 352 is transferred to an information determination circuit 360. The information determination circuit 360 develops a high level logic signal to enable an AND gate 364. Therefore, the other function key signal is transferred to the following central processor unit 3.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A teller machine for performing various teller functions comprising:
   a keyboard panel including numeral keys and function keys for introducing transaction data representative of the various teller functions;
   primary memory means for storing the transaction data introduced by said keyboard panel;
   auxiliary memory means for accumulating all transaction data associated with selected ones of said various teller functions and for storing the accumulated data;
   control means for receiving said transaction data from said primary memory means and for transferring the said transaction data associated with only the selected ones of said various teller functions to said auxiliary memory for accumulation therein, said control means including a preset memory means for storing an indication of whether each of said function keys corresponds to a selected teller function.

2. The teller machine of claim 1 further comprising operation control means for performing operations on said transaction data, the results of the operations being included in the transaction data stored in said primary memory means.

3. The teller machine of claim 2 further comprising printer means for printing out the transaction data stored in said primary memory means;
   said keyboard panel further including a duplicate key for instructing said printer means to print out the transaction data stored in said primary memory means on a desired bill.

4. The teller machine of claim 3 further comprising print control means for limiting the number of bills printed by said printer means in response to instructions from said duplicate key.

5. The teller machine of claim 3 further comprising bill printout control means for instructing said printer means to print out a bill only when selected teller functions are performed.

6. The teller machine of claim 3 wherein said printer means also prints out the transaction data stored in said auxiliary memory onto a desired bill.

7. The teller machine of claim 6, further comprising a counter for counting the number of bills printed by said printer means.

8. The teller machine of claim 7, further comprising counter control means for allowing the counter to be incremented only when selected teller functions are performed.

* * * * *